(12) United States Patent
Adachi

(10) Patent No.: US 9,288,737 B2
(45) Date of Patent: Mar. 15, 2016

(54) COMMUNICATION CONTROL METHOD, USER TERMINAL, BASE STATION, AND HOME BASE STATION

(71) Applicant: KYOCERA CORPORATION, Kyoto-shi, Kyoto (JP)

(72) Inventor: Hiroyuki Adachi, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/384,693

(22) PCT Filed: Mar. 15, 2013

(86) PCT No.: PCT/JP2013/057514
§ 371 (c)(1),
(2) Date: Sep. 12, 2014

(87) PCT Pub. No.: WO2013/137460
PCT Pub. Date: Sep. 19, 2013

(65) Prior Publication Data
US 2015/0079937 A1 Mar. 19, 2015

Related U.S. Application Data

(60) Provisional application No. 61/612,035, filed on Mar. 16, 2012.

(51) Int. Cl.
*H04M 1/66* (2006.01)
*H04W 36/34* (2009.01)
(Continued)

(52) U.S. Cl.
CPC ............. *H04W 36/34* (2013.01); *H04W 12/06* (2013.01); *H04W 12/08* (2013.01); *H04W 24/10* (2013.01);
(Continued)

(58) Field of Classification Search
CPC ..................................................... H04W 12/06
USPC .......................................................... 375/411
See application file for complete search history.

(56) References Cited

U.S. PATENT DOCUMENTS 8,711,767 B2 * 4/2014 Balasubramanian et al. 370/328
2008/0294337 A1 * 11/2008 Dawson et al. ............... 701/209
(Continued)

FOREIGN PATENT DOCUMENTS

JP 2006-222549 A 8/2006
JP 2007-006320 A 1/2007
(Continued)

OTHER PUBLICATIONS

3GPP TS 36.300 V11.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Valbonne—France, 2011, pp. 1-194.
(Continued)

*Primary Examiner* — Santiago Garcia
(74) *Attorney, Agent, or Firm* — Hauptman Ham, LLP

(57) ABSTRACT

A communication control method applied to a mobile communication system, the mobile communication system including a home base station that forms a specific cell, and a mobility management device that performs verification of a user terminal for access permission to the specific cell in a handover procedure of the user terminal to the specific cell, comprises a step A of updating, by the user terminal, a list of a specific cell accessible by the user terminal; and a step B of omitting the verification of the user terminal by the mobility management device in the handover procedure when an elapsed time period after the update of the list is within a predetermined time period.

11 Claims, 8 Drawing Sheets

(51) Int. Cl.
*H04W 12/06* (2009.01)
*H04W 36/00* (2009.01)
*H04W 12/08* (2009.01)
*H04W 24/10* (2009.01)
*H04W 36/04* (2009.01)
*H04W 48/02* (2009.01)
*H04W 84/04* (2009.01)

(52) U.S. Cl.
CPC .......... *H04W 36/0061* (2013.01); *H04W 36/04* (2013.01); *H04W 48/02* (2013.01); *H04W 84/045* (2013.01)

(56) References Cited

U.S. PATENT DOCUMENTS

| | | | |
|---|---|---|---|
| 2009/0009280 A1* | 1/2009 | Ishihara | 336/234 |
| 2009/0092080 A1 | 4/2009 | Balasubramanian et al. | |
| 2009/0092081 A1* | 4/2009 | Balasubramanian et al. | 370/328 |
| 2010/0088416 A1* | 4/2010 | Kurita | 709/227 |
| 2010/0210239 A1* | 8/2010 | Karaoguz et al. | 455/411 |
| 2010/0267405 A1 | 10/2010 | Chin et al. | |
| 2011/0129128 A1* | 6/2011 | Makimoto et al. | 382/124 |
| 2012/0014267 A1* | 1/2012 | Gomes et al. | 370/252 |
| 2012/0159139 A1* | 6/2012 | Kim et al. | 713/2 |
| 2014/0156189 A1* | 6/2014 | Hart et al. | 701/538 |
| 2014/0233533 A1* | 8/2014 | Kawasaki | 370/332 |
| 2014/0242995 A1* | 8/2014 | Lee et al. | 455/436 |

FOREIGN PATENT DOCUMENTS

| | | |
|---|---|---|
| JP | 2010-093585 A | 4/2010 |
| JP | 2011-501515 A | 1/2011 |
| JP | 2011-160484 A | 8/2011 |

OTHER PUBLICATIONS

International Search Report mailed Jun. 4, 2013, in corresponding International Application No. PCT/JP2013/057514.
Huawei: "Inter-CSG mobility between HeNBs", 3GPP Draft; R3-111855 Inter-CSG Mobility Between—HeNBs, 3RD Generation Partnership Project (3GPP), Mobile Competence Centre; 650, Route Des Lucioles; F-06921 Sophia-Antipolis Cedex; France, vol. RAN WG3, No. Athens, Greece; 20110822, Sep. 9, 2011, XP050541486, [retrieved on Sep. 9, 2011].
Extended European Search Report in EP Application No. 13761266.9, dated Nov. 3, 2015.

* cited by examiner

COMMUNICATION CONTROL METHOD, USER TERMINAL, BASE STATION, AND HOME BASE STATION

RELATED APPLICATIONS

The present application is a National Phase of International Application Number PCT/JP2013/057514 filed on Mar. 15, 2013, and claims priority of U.S. Provisional Application No. 61/612,035 filed on Mar. 16, 2012.

TECHNICAL FIELD

The present invention relates to a communication control method, a user terminal, a base station, and a home base station in a mobile communication system.

BACKGROUND ART

In 3GPP (3rd Generation Partnership Project) which is a project aiming to standardize a mobile communication system, specifications of a home base station, which is a small base station provided in a home or a company, are discussed (see Non Patent Document 1).

A home base station forms a specific cell such as a CSG (Closed Subscriber Group) cell or a hybrid cell. The CSG cell is a cell accessible only by a user terminal (called a "CSG member") having an access permission. The hybrid cell is accessible by other terminals other than the CSG member, but the CSG member is advantageously treated.

In addition, it is noted that a "cell" is used as a term indicating a minimum unit of a radio communication area, and is also used as a term indicating a function of performing radio communication with a user terminal.

In a handover procedure of a user terminal to a specific cell, a mobility management device included in a core network performs verification (access control) of the user terminal for access permission to the specific cell.

PRIOR ART DOCUMENT

Non-Patent Document

[Non-patent Document 1] 3GPP technology specifications "TS 36.300 V11.0.0" December, 2011

SUMMARY OF THE INVENTION

However, when the mobility management device performs the verification of the user terminal in the course of the handover procedure, the handover procedure via the core network should be performed. Therefore, there is a problem that much time is required for the handover procedure and traffic of the core network is increased.

Therefore, an object thereof is to provide a communication control method, a user terminal, a base station, and a home base station, by which it is possible to efficiently perform a handover procedure to a specific cell.

A communication control method of the present invention is a communication control method applied to a mobile communication system, the mobile communication system including a home base station that forms a specific cell, and a mobility management device that performs verification of a user terminal for access permission to the specific cell in a handover procedure of the user terminal to the specific cell, and the communication control method comprises a step A of updating, by the user terminal, a list of a specific cell accessible by the user terminal, and a step B of omitting the verification of the user terminal by the mobility management device in the handover procedure when an elapsed time period after the update of the list is within a predetermined time period.

MODES FOR CARRYING OUT THE INVENTION

[Overview of Embodiment]

Figure 1:
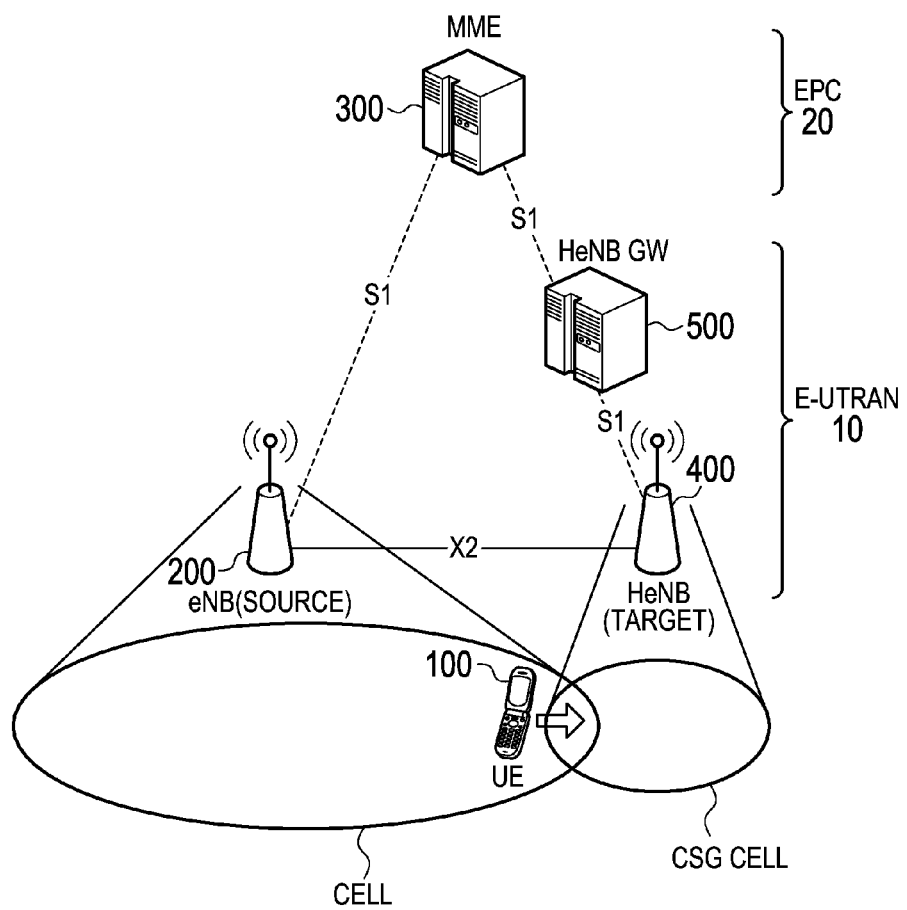
FIG. 1 is a configuration diagram of a mobile communication system.

A communication control method according to an embodiment is applied to a mobile communication system including a home base station configured to form a specific cell, and a mobility management device configured to perform verification of a user terminal for access permission to the specific cell in a handover procedure of the user terminal to the specific cell. The communication control method includes a step A of updating, by the user terminal, a list (that is, a white list) of a specific cell accessible by the user terminal, and a step B of omitting verification of the user terminal by the mobility management device in the handover procedure when an elapsed time period (hereinafter, referred to as "white list elapsed time period") after the update of the list is within a predetermined time period (hereinafter, referred to as "white list guarantee time period").

In this way, when the white list elapsed time period is within the white list guarantee time period, the reliability of the white list is regarded to be high and the verification of the user terminal by the mobility management device is omitted in the course of the handover procedure. In this case, it is possible to apply the handover procedure that bypasses a core network, so that it is possible to efficiently perform the handover procedure to the specific cell.

In the present embodiment, the communication control method further may comprise a step C of transmitting, by the user terminal, a measurement report regarding the specific cell to a serving cell before the handover procedure, wherein in the step C, the user terminal transmits predetermined information on the elapsed time period or an update time of the list together with the measurement report.

In the present embodiment, the predetermined information may indicate whether the elapsed time period is within the predetermined time period.

In the present embodiment, in the step A, the user terminal may update the list in response to a list update message from the mobility management device, and the list update message may include information for designating the predetermined time period.

In the present embodiment, the communication control method further may comprise a step D of omitting, by a base station forming the serving cell, the verification of the user terminal by the mobility management device and transmitting a handover request to the home base station when it is determined to perform handover of the user terminal to the specific cell and determined that the elapsed time period is within the predetermined time period on the basis of the predetermined information.

In the present embodiment, the communication control method further may comprises a step E of requesting, by the base station, the mobility management device to perform the verification of the user terminal when it is determined to perform the handover of the user terminal to the specific cell and determined that the elapsed time period exceeds the predetermined time period on the basis of the predetermined information.

In the present embodiment, the communication control method further may comprises a step F of transmitting, by a base station forming the serving cell, the predetermined information to the home base station together with a handover request when it is determined to perform handover of the user terminal to the specific cell.

In the present embodiment, the communication control method further may comprises a step G of omitting, by the home base station, the verification of the user terminal by the mobility management device and transmitting a response for the handover request to the base station when it is determined that the elapsed time period is within the predetermined time period on the basis of the predetermined information.

In the present embodiment, the communication control method further may comprises a step H of requesting, by the home base station, the mobility management device to perform the verification of the user terminal when it is determined that the elapsed time period exceeds the predetermined time period on the basis of the predetermined information.

A user terminal of the present embodiment performs handover to a specific cell from a serving cell in a mobile communication system including a mobility management device that performs verification for access permission to the specific cell in a handover procedure to the specific cell. The user terminal comprises a control unit that controls to update a list of a specific cell accessible by the user terminal and a transmission unit that transmits a measurement report regarding the specific cell to the serving cell, wherein the transmission unit transmits predetermined information on an elapsed time period after the update of the list or an update time of the list together with the measurement report.

A base station of the present invention forms a serving cell of a user terminal in a mobile communication system including a mobility management device that performs verification for access permission to the specific cell in a handover procedure to the specific cell and the user terminal that updates a list of a specific cell accessible by the user terminal. A base station comprises a control unit that controls to omit verification, by the mobility management device, of the user terminal in the handover procedure when an elapsed time period after the update of the list is within a predetermined time period.

A home base station of the present invention forms a specific cell in a mobile communication system including a mobility management device that performs verification for access permission to the specific cell in a handover procedure to the specific cell and a user terminal that updates a list of a specific cell accessible by the user terminal. A home base station comprises a control unit that controls to omit verification, by the mobility management device, of the user terminal in the handover procedure when an elapsed time period after the update of the list is within a predetermined time period.

[First Embodiment]

In the present embodiment, an example of a mobile communication system configured on the basis of 3GPP standards (that is, LTE-Advanced) after release 10 will be described.

Hereinafter, (1) Overview of mobile communication system, (2) Block configuration, (3) Operation of first embodiment, and (4) Conclusion of first embodiment will be sequentially described.

(1) Overview of Mobile Communication System

FIG. 1 is a configuration diagram of a mobile communication system according to the present embodiment. As illustrated in FIG. 1, the mobile communication system includes a user terminal (UE: User Equipment) 100, a base station (eNB: evolved Node-B) 200, a mobility management device (MME: Mobility Management Entity) 300, a home base station (HeNB: Home evolved Node-B) 400, and a gateway device (HeNB GW: Home evolved Node-B Gateway) 500.

Each of the eNB 200, the HeNB 400, and the HeNB GW 500 is a network device included in a radio access network (E-UTRAN: Evolved-UMTS Terrestrial Radio Access Network) 10. The MME 300 is a network device included in a core network (EPC: Evolved Packet Core) 20.

The UE 100 is a mobile radio communication device carried by a user. The UE 100 performs radio communication with a cell (called a "serving cell"), with which a connection is established, in a connected state corresponding to a state during communication.

When the UE 100 moves together with the movement of a user, a change in the serving cell of the UE 100 is necessary. An operation, in which the UE 100 changes the serving cell in an RRC connected state, is called "handover". A series of procedures of the handover are called a "handover procedure". The handover procedure includes a preparation stage (Preparation), an execution stage (Execution), and a completion stage (Completion).

In the present embodiment, the UE 100 employing a cell of the eNB 200 as a serving cell moves toward a cell of the HeNB 400, thereby performing handover from the cell of the eNB 200 to the cell of the HeNB 400. In this case, in the handover procedure, the cell of the eNB 200 is a "source cell" and the cell of the HeNB 400 is a "target cell".

The eNB 200 is a macro base station (MeNB), a pico base station (PeNB), or a home base station (HeNB). In the present embodiment, a description will be provided for an example in which the eNB 200 is MeNB. The eNB 200 forms one cell or a plurality of cells. The eNB 200 performs radio communication with the UE 100.

The eNB 200 has a determination right of handover for the UE 100 subordinate to the cell of the eNB 200. Specifically, the eNB 200 is able to determine whether to perform handover of the UE 100 to a CSG cell on the basis of a measurement report from the UE 100.

The eNB 200 communicates with the EPC 20 through an S1 interface that is a logical communication path between the eNB 200 and the EPC 20. Specifically, the eNB 200 communicates with the MME 300 through an S1-MME interface which is a kind of the S1 interface. Moreover, the eNB 200 is able to perform inter-base station communication with an adjacent HeNB 400 through an X2 interface that is a logical communication path between the adjacent HeNB 400 and the eNB 200.

The MME 300 is provided corresponding to a control plane dealing with control information, and performs various types of mobility management or verification processes for the UE

100. The MME 300 performs the verification (hereinafter, referred to as "CSG verification") of the UE 100 for access permission to the CSG cell and a hybrid cell.

A general handover procedure to the CSG cell uses the S1 interface. Specifically, the MME 300 performs the CSG verification of the UE 100, specifically, confirms whether the UE 100 is a member UE of the CSG cell. When it is confirmed that the UE 100 is the member UE of the CSG cell (that is, in the case of CSG verification success), the handover of the UE 100 to the CSG cell is possible. On the other hand, when it is not confirmed that the UE 100 is the member UE of the CSG cell (that is, in the case of CSG verification failure), the handover of the UE 100 to the CSG cell is rejected.

The HeNB 400 is a small stationary radio communication device installable within the house. The eNB 200 forms a specific cell having a coverage narrower than that of a cell. The specific cell is called a "CSG cell", a "hybrid cell", or an "open cell" according to a set access mode.

The CSG cell is a cell accessible only by a UE 100 (called a "member UE") having an access permission, and broadcasts CSG ID. The UE 100 holds a list (white list) of CSG ID for which the UE 100 has an access permission, and determines the presence or absence of access permission on the basis of the white list, and the CSG ID broadcasted by the CSG cell.

The hybrid cell is a cell in which the member UE is more advantageously treated as compared with a non-member UE, and broadcasts information, which indicates that the hybrid cell is a cell released to the non-member UE, in addition to the CSG ID. The UE 100 determines the presence or absence of access permission on the basis of the white list, and the CSG ID broadcasted by the hybrid cell.

As described above, the UE 100 confirms the presence or absence of access permission on the basis of the white list, but the white list managed by the UE 100 and CSG subscriber information (CSG Subscription Data) managed by the MME 300 are not always synchronized with each other. Therefore, basically, in a handover procedure of the UE 100 to the CSG cell or the hybrid cell, the CSG verification of the UE 100 by the MME 300 is necessary.

The open cell is a cell in which the UE 100 is equivalently treated regardless of whether the UE 100 is a member, and does not broadcast the CSG ID. In view of the UE 100, the open cell is equal to a cell.

In the present embodiment, a description will be provided for an example in which a cell (a specific cell) of the HeNB 400 is the CSG cell. However, the cell (the specific cell) of the HeNB 400 may be the hybrid cell.

The HeNB 400 communicates with the MME 300 via the HeNB GW 500 through the S1 interface (the S1-MME interface). However, when the S1 interface not via the HeNB GW 500 is established between the HeNB 400 and the MME 300, the HeNB 400 is able to also directly communicate with the MME 300 without via the HeNB GW 500.

The HeNB 400 is connected to the eNB 200 through the X2 interface. Hereinafter, a connection through the X2 interface will be referred to as an "X2 connection".

The HeNB GW 500 manages a set of a plurality of HeNBs 400 between the EPC 20 (the MME 300) and the plurality of HeNBs 400. In view of the MME 300, the HeNB GW 500 is equal to the HeNB 400. On the other hand, in view of the HeNB 400, the HeNB GW 500 is equal to the MME 300. The HeNB GW 500 communicates with the MME 300 as a representative of the plurality of HeNBs 400, thereby reducing traffic to be transmitted to and received from the MME 300. Furthermore, the HeNB GW 500 is also able to relay data from one HeNB 400 managed by the HeNB GW 500 to another HeNB 400.

Figure 2:
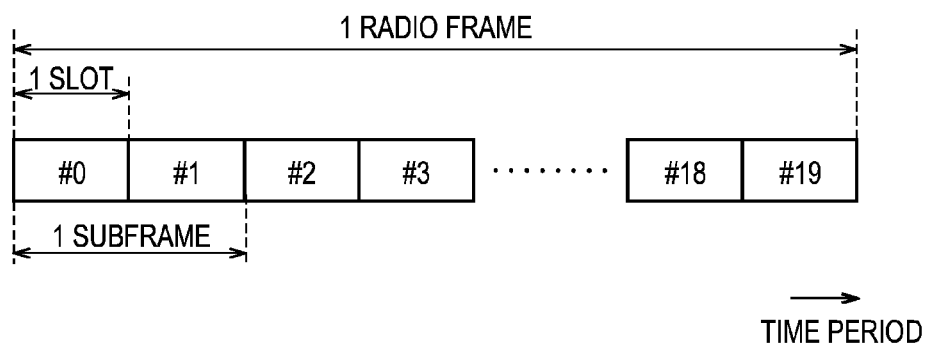
FIG. 2 is a configuration diagram of a radio frame used in the mobile communication system.

FIG. 2 is a configuration diagram of a radio frame used in the mobile communication system (an LTE system) according to the present embodiment. The LTE system employs OFDMA (Orthogonal Frequency Division Multiplexing Access) in a downlink and SC-FDMA (Single Carrier Frequency Division Multiple Access) in an uplink.

As illustrated in FIG. 2, the radio frame includes 10 subframes arranged in a time direction, wherein each subframe includes two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP).

In the downlink, an interval of several symbols at the head of each subframe is a control region mainly used as a physical downlink control channel (PDCCH). Furthermore, the other interval of each subframe is a data region mainly used as a physical downlink shared channel (PDSCH).

In the uplink, both end portions in the frequency direction of each subframe are control regions mainly used as a physical uplink control channel (PUCCH). Furthermore, the center portion in the frequency direction of each subframe is a data region mainly used as a physical uplink shared channel (PUSCH).

(2) Block Configuration

Hereinafter, the block configurations of the UE 100, the eNB 200, the MME 300, the HeNB 400, and the HeNB GW 500 will be described.

(2.1) UE

Figure 3:
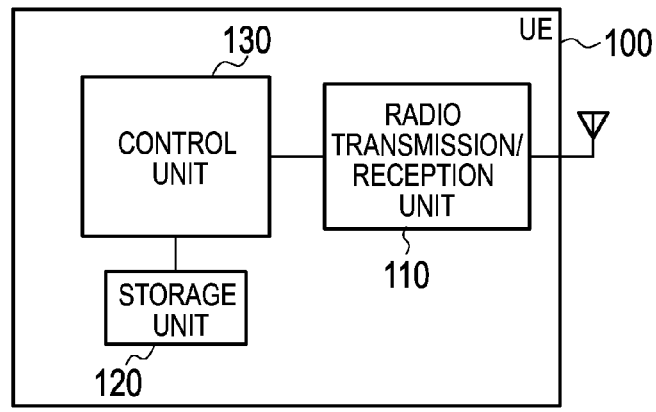
FIG. 3 is a block diagram of UE.

FIG. 3 is a block diagram of the UE 100. As illustrated in FIG. 3, the UE 100 includes a radio transmission/reception unit 110, a storage unit 120, and a control unit 130.

The radio transmission/reception unit 110 transmits/receives a radio signal.

The storage unit 120 stores various types of information that is used for the control by the control unit 130. The control unit 130 controls various functions of the UE 100. In a connected state, the control unit 130 controls the radio transmission/reception unit 110 to perform radio communication with a serving cell.

The storage unit 120 stores a white list. The white list is updated by the control unit 130. In the connected state, the control unit 130 updates the white list in response to a white list update message from the MME 300. The control unit 130 manages an elapsed time period (a white list elapsed time period) after updating the white list. For example, whenever updating the white list, the control unit 130 records a time (an updated time) of the update. Alternatively, when updating the white list, the control unit 130 activates a timer for counting a white list elapsed time period.

The storage unit 120 stores a white list guarantee time period. The white list guarantee time period may be a fixed length of time period stored in the storage unit 120 in advance. Alternatively, when the white list guarantee time period is included in the white list update message from the MME 300, the control unit 130 may update the white list guarantee time period stored in the storage unit 120 using the white list guarantee time period included in the white list update message.

When the white list guarantee time period is set as the fixed length of time, it is possible to set the white list guarantee time period as follows. As a kind of a CSG member, there is a temporary CSG member (Temporary Member). When a period (hereinafter, referred to as "member period") settable for the temporary CSG member, for example, is in the range from 2.4 hours to three days, it is sufficient if 2.4 hours (the shortest member period) is set as the white list guarantee time period.

When it is determined to transmit a measurement report, the control unit 130 compares the white list elapsed time period managed therein with the white list guarantee time period stored in the storage unit 120. Then, the control unit 130 generates white list update information (Whitelist Update Info.) indicating whether the white list elapsed time period is within the white list guarantee time period.

Furthermore, the storage unit 120 stores location information (fingerprint information) on the location of the CSG cell for which the UE 100 has an access permission.

When the UE 100 is in a connected state in the cell of the eNB 200, if it is detected that the UE 100 has entered the vicinity of the CSG cell, for which the UE 100 has an access permission, on the basis of the location information (the fingerprint information) on the location of the CSG cell for which the UE 100 has an access permission, the control unit 130 controls the radio transmission/reception unit 110 to transmit proximity notification (Proximity Indication) to the eNB 200.

When the radio transmission/reception unit 110 receives measurement control information (Measurement configuration) on the CSG cell from the eNB 200 in response to the proximity notification, the control unit 130 controls the radio transmission/reception unit 110 to transmit a measurement report including a physical identifier (PCI: Physical Cell Identifier) of the CSG cell to the eNB 200.

When the radio transmission/reception unit 110 receives request information (SI request) requesting the acquisition of broadcast information (SI: System Information) from the eNB 200 in response to the measurement report, the control unit 130 acquires broadcast information of the CSG cell and controls the radio transmission/reception unit 110 to transmit a measurement report on the basis of the broadcast information to the eNB 200. The measurement report includes an identifier (CGI: Cell Global Identifier) of the CSG cell, a tracking area identifier (TAI), CSG ID, and status information (Membership status) indicating whether the UE 100 is a CSG member.

The control unit 130 transmits the white list update information together with the measurement report. The white list update information may be a message separately from the measurement report, or a message common with the measurement report. In the present embodiment, one bit of white list update information is included in the measurement report. For example, when the white list elapsed time period is within the white list guarantee time period, "1" is set as the white list update information, and when the white list elapsed time period is out of the white list guarantee time period, "0" is set as the white list update information.

Then, when the radio transmission/reception unit 110 receives a handover command (H.O. command) to the CSG cell from the eNB 200, the control unit 130 starts a process of establishing a connection (RRC connection) to the CSG cell.

(2.2) eNB

Figure 4:
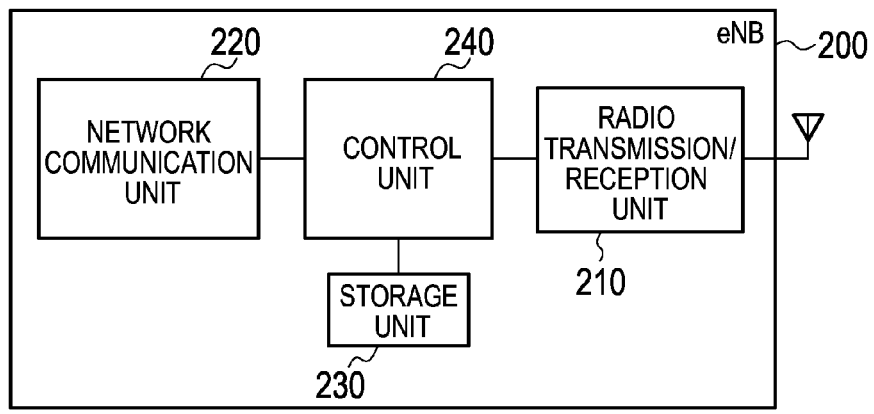
FIG. 4 is a block diagram of eNB.

FIG. 4 is a block diagram of the eNB 200. As illustrated in FIG. 4, the eNB 200 includes a radio transmission/reception unit 210, a network communication unit 220, a storage unit 230, and a control unit 240.

The radio transmission/reception unit 210 transmits/receives a radio signal. Furthermore, the radio transmission/reception unit 210 forms one cell or a plurality of cells.

The network communication unit 220 communicates with the MME 300 through the S1 interface. The network communication unit 220 performs inter-base station communication with the HeNB 400 through the X2 interface.

The storage unit 230 stores various types of information that is used for the control by the control unit 240.

The control unit 240 controls various functions of the eNB 200.

When the radio transmission/reception unit 210 receives the proximity notification (Proximity Indication) from the UE 100 subordinate to the eNB 200, the control unit 240 controls the radio transmission/reception unit 210 to transmit measurement control information (Measurement configuration) for instructing measurement for the CSG cell to the UE 100.

When the radio transmission/reception unit 210 receives the measurement report including the physical identifier (PCI: Physical Cell Identifier) of the CSG cell from the UE 100 in response to the measurement control information, the control unit 240 controls the radio transmission/reception unit 210 to transmit the request information (SI request) requesting the acquisition of broadcast information (SI: System Information) of the CSG cell to the UE 100.

When the radio transmission/reception unit 210 receives the measurement report based on the broadcast information of the CSG cell from the UE 100 in response to the request information, the control unit 240 determines whether to perform handover of the UE 100 to the CSG cell on the basis of the measurement report.

The measurement report includes the white list update information. The control unit 240 determines whether to omit the CSG verification of the UE 100 by the MME 300 in response to the white list update information included in the measurement report. Specifically, when it is confirmed that the white list elapsed time period is within the white list guarantee time period on the basis of the white list update information, the control unit 240 determines to omit the CSG verification. On the other hand, when it is confirmed that the white list elapsed time period exceeds the white list guarantee time period on the basis of the white list update information, the control unit 240 determines to perform the CSG verification.

As described above, since the white list is considered to be synchronized with the CSG subscriber information (CSG Subscription Data) managed by the MME 300 immediately after update, when the white list elapsed time period is within the white list guarantee time period, the CSG verification of the UE 100 by the MME 300 is omitted.

When it is determined to perform the handover of the UE 100 to the CSG cell and when it is determined to omit the CSG verification of the UE 100 by the MME 300 on the basis of the white list update information, the control unit 240 omits the CSG verification of the UE 100 by the MME 300, and controls the network communication unit 220 to transmit a handover request (H.O. Request) to the HeNB 400 through the X2 interface.

Meanwhile, when it is determined to perform the handover of the UE 100 to the CSG cell and when it is determined to perform the CSG verification of the UE 100 by the MME 300 on the basis of the white list update information, the control unit 240 controls the network communication unit 310 to transmit a CSG verification request of the UE 100 to the MME 300 through the S1 interface. The CSG verification request includes the CSD ID of the CSG cell and the identification information of the UE 100.

When a verification result (CSG verification Ack) indicating CSG verification success is obtained from the MME 300, the control unit 240 controls the network communication unit 220 to transmit the handover request (H.O. Request) to the HeNB 400 through the X2 interface. When a verification result (CSG verification Nack) indicating CSG verification failure is obtained from the MME 300, the control unit 240 stops the handover of the UE 100 to the CSG cell.

Then, when a positive response (H.O. Request Ack) for the handover request is obtained from the HeNB 400, the control unit 240 controls the radio transmission/reception unit 210 to transmit a command of the handover (H.O. Command) to the CSG cell to the UE 100.

(2.3) MME

Figure 5:
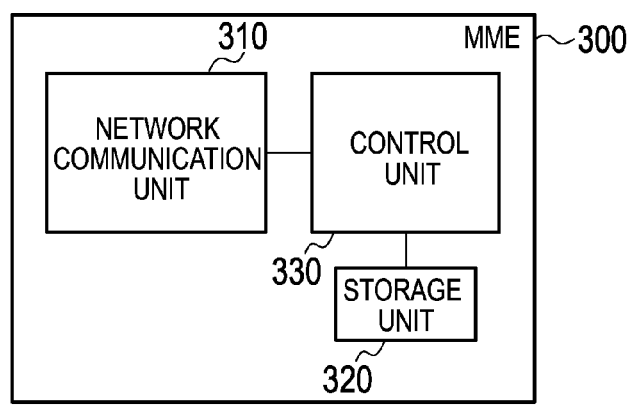
FIG. 5 is a block diagram of MME.

FIG. 5 is a block diagram of the MME 300. As illustrated in FIG. 5, the MME 300 includes a network communication unit 310, a storage unit 320, and a control unit 330.

The network communication unit 310 communicates with the eNB 200 and the HeNB GW 500 through the S1 interface.

The storage unit 320 stores various types of information that is used for the control by the control unit 330. The storage unit 320 stores CSG subscriber information (CSG Subscription Data) regarding the access permission of the UE 100. The CSG subscriber information (CSG Subscription Data) is obtained by associating the identifier of the UE 100 with CSD ID of each CSG cell for which the UE 100 has an access permission.

The control unit 330 controls various functions of the MME 300.

When updating the CSG subscriber information, the control unit 330 may control the network communication unit 310 to transmit, to the UE 100, a white list update message for updating the white list of the UE 100. At this time, the control unit 330 may allow information for designating the white list guarantee time period to be included in the white list update message.

In the case in which it is possible to designate the white list guarantee time period, when updating the white list for the aforementioned temporary CSG member (Temporary Member), it is possible to set a white list guarantee time period having a time length corresponding to the member period.

When the network communication unit 310 receives the CSG verification request of the UE 100 from the eNB 200, the control unit 330 performs CSG verification of the UE 100 on the basis of the CSD ID and the identification information of the UE 100, which are included in the CSG verification request, and the CSG subscriber information stored in the storage unit 320.

When the CSD ID and the identification information of the UE 100, which are included in the CSG verification request, are associated with the CSG subscriber information, the control unit 330 determines CSG verification success and controls the network communication unit 310 to transmit a response (CSG verification Ack) indicating the CSG verification success to the eNB 200 through the S1 interface.

Meanwhile, when the CSD ID and the identification information of the UE 100, which are included in the CSG verification request, are not associated with the CSG subscriber information, the control unit 330 determines CSG verification failure and controls the network communication unit 310 to transmit a response (CSG verification Nack) indicating the CSG verification failure to the eNB 200 through the S1 interface.

(2.4) HeNB

Figure 6:
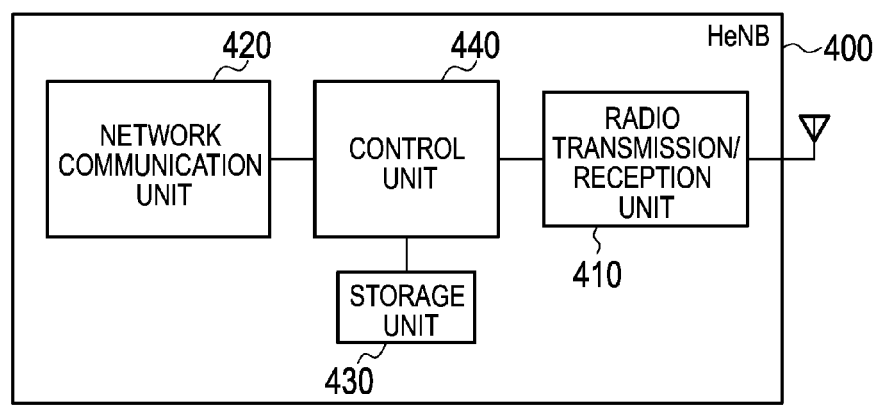
FIG. 6 is a block diagram of HeNB.

FIG. 6 is a block diagram of the HeNB 400. As illustrated in FIG. 6, the HeNB 400 includes a radio transmission/reception unit 410, a network communication unit 420, a storage unit 430, and a control unit 440.

The radio transmission/reception unit 410 transmits/receives a radio signal. In the present embodiment, the radio transmission/reception unit 410 forms the CSG cell. The CSG cell (the radio transmission/reception unit 410) transmits broadcast information through BCCH (Broadcast Control Channel). The broadcast information includes CGI, TAI, and CSG ID.

The network communication unit 420 communicates with the MME 300 via the HeNB GW 500 through the S1 interface. The network communication unit 220 performs inter-base station communication with the eNB 200 through the X2 interface.

The storage unit 430 stores various types of information that is used for the control by the control unit 440.

The control unit 440 controls various functions of the HeNB 400.

When the network communication unit 420 receives the handover request from the eNB 200, the control unit 440 determines whether to permit the handover request. When determining to permit the handover request, the control unit 440 controls the network communication unit 420 to transmit a positive response (HO Request Ack) for the handover request to the eNB 200 through the X2 interface. On the other hand, when determining to reject the handover request, the control unit 440 controls the network communication unit 420 to transmit a negative response (HO Request Nack) for the handover request to the eNB 200 through the X2 interface.

(2.5) HeNB GW

Figure 7:
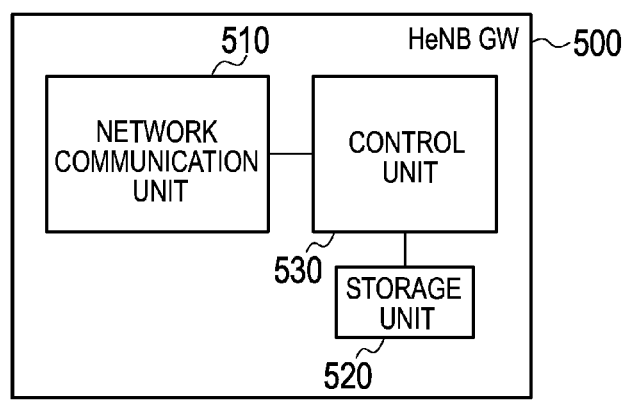
FIG. 7 is a block diagram of HeNB GW.

FIG. 7 is a block diagram of the HeNB GW 500. As illustrated in FIG. 7, the HeNB GW 500 includes a network communication unit 510, a storage unit 520, and a control unit 530.

The network communication unit 510 communicates with the MME 300 and the HeNB 400 through the S1 interface.

The storage unit 520 stores various types of information that is used for the control by the control unit 530. In the storage unit 520, the HeNB 400 managed by the HeNB GW 500 has been registered.

The control unit 530 controls various functions of the HeNB GW 500. The control unit 530 manages a set of a plurality of HeNBs 400. The control unit 530 controls the network communication unit 510 to communicate with the MME 300 as a representative of the plurality of HeNBs 400.

(3) Operation of First Embodiment

Hereinafter, operation sequences 1 and 2 of the mobile communication system according to the present embodiment will be described.

The operation sequence 1 is an operation sequence when the UE 100 updates the white list and performs handover to the CSG cell within the white list guarantee time period.

The operation sequence 2 is an operation sequence when the UE 100 updates the white list and performs handover to the CSG cell after the white list guarantee time period elapses.

(3.1) Operation Sequence 1

Figure 8:
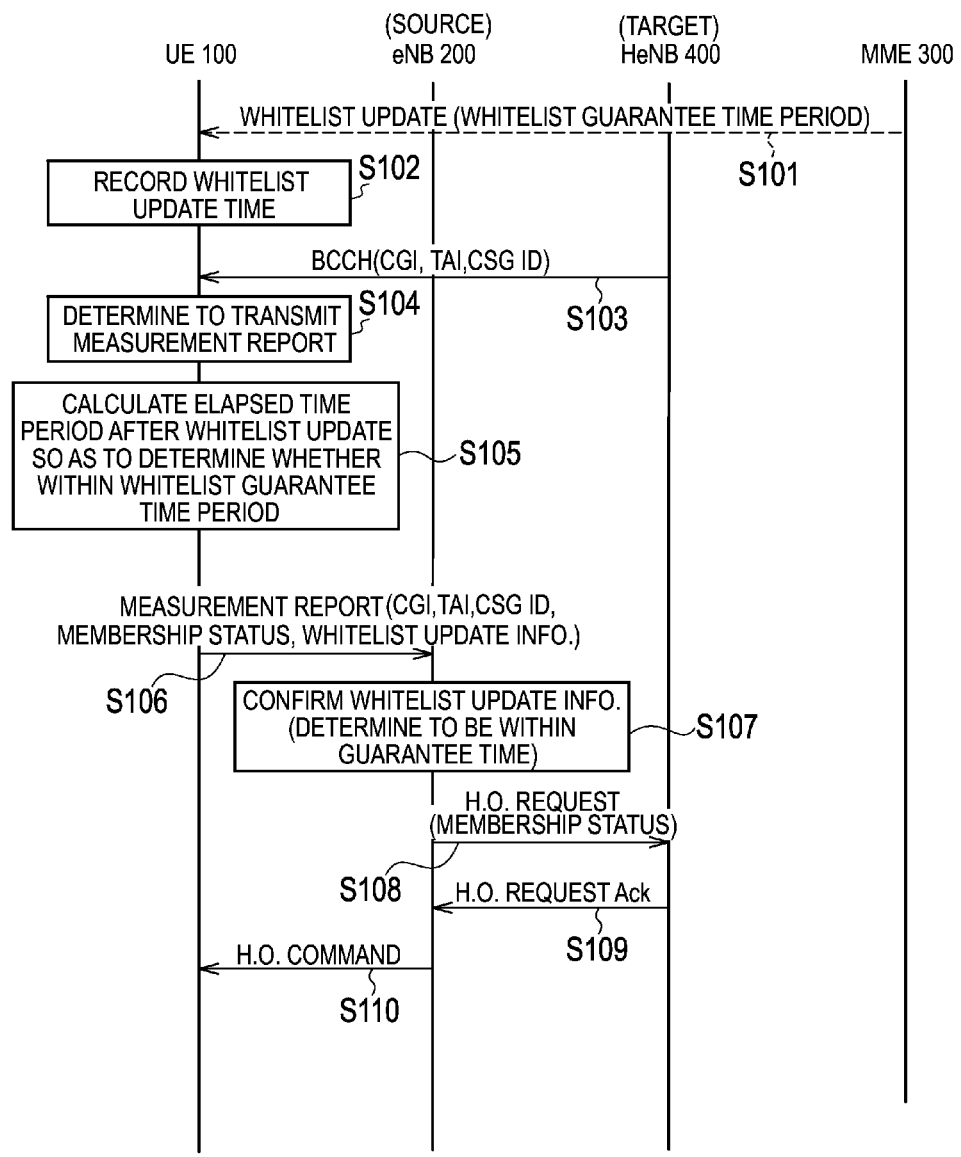
FIG. 8 is a sequence diagram of an operation sequence 1 according to a first embodiment.

FIG. 8 is a sequence diagram of the operation sequence 1 according to the present embodiment. In an initial state of the present sequence, the UE 100 is in a connected state and performs communication by employing the cell of the eNB 200 as a serving cell.

As illustrated in FIG. 8, in step S101, the MME 300 transmits, to the UE 100, a white list update message for updating a white list of the UE 100 via the eNB 200. The white list update message includes information for designating a white list guarantee time period.

In step S102, the UE 100 updates its own white list and records a white list update time in response to the white list update message from the MME 300, and stores a white list guarantee time period included in the white list update message. The UE 100 may activate a timer for counting a white list elapsed time period, instead of recording the white list update time.

In step S103, the UE 100 receives broadcast information from the HeNB 400 through BCCH.

In step S104, the UE 100 determines to transmit a measurement report to the serving cell (the eNB 200) in response to the generation of a trigger at which the measurement report is to be transmitted.

In step S105, the UE 100 calculates the white list elapsed time period on the basis of the white list update time recorded in step S101, and a current time. Alternatively, the UE 100 acquires the white list elapsed time period on the basis of a value of the aforementioned timer. The UE 100 determines whether the white list elapsed time period is within the white list guarantee time period. Hereinafter, a description will be given on the assumption that the white list elapsed time period is determined to be within the white list guarantee time period.

In step S106, the UE 100 transmits a measurement report including CGI, TAI, CSG ID, Membership status, and white list update information (Whitelist Update Info.) to the eNB 200. The white list update information indicates that that the white list elapsed time period is within the white list guarantee time period.

In step S107, the eNB 200 determines to perform handover of the UE 100 to the CSG cell of the HeNB 400 on the basis of the measurement report from the UE 100. From the time point at which it is determined to perform the handover of the UE 100 to the CSG cell, a preparation stage (Preparation) in the handover procedure is started. Furthermore, the eNB 200 determines whether to omit the CSG verification of the UE 100 by the MME 300 on the basis of the white list update information included in the measurement report. Here, the eNB 200 confirms that the white list elapsed time period is within the white list guarantee time period on the basis of the white list update information, and determines to omit the CSG verification.

In step S108, the eNB 200 transmits a handover request (H.O. Request) for requesting acceptance of the UE 100 to the HeNB 400 through the X2 interface. The handover request includes Membership status. When the handover request is received from the eNB 200, the HeNB 400 determines whether to permit the handover request on the basis of the handover request. Hereinafter, a description will be given on the assumption that the handover request is permitted.

In step S109, the HeNB 400 transmits a positive response (H.O. Request Ack) for the handover request to the eNB 200 through the X2 interface.

In step S110, the eNB 200 transmits a command of the handover (H.O. Command) to the CSG cell to the UE 100 in response to the reception of the positive response (H.O. Request Ack) from the HeNB 400.

(3.2) Operation Sequence 2

Figure 9:
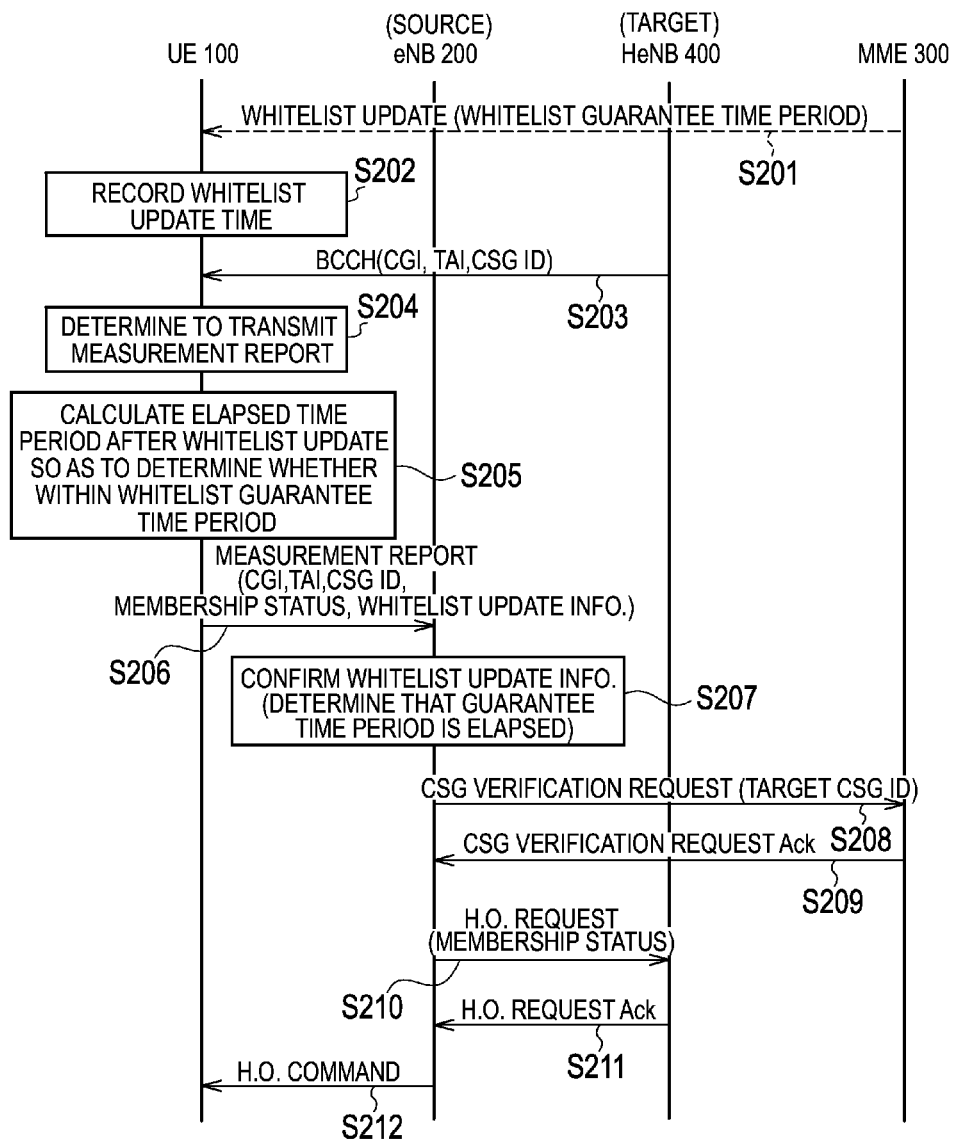
FIG. 9 is a sequence diagram of an operation sequence 2 according to the first embodiment.

FIG. 9 is a sequence diagram of the operation sequence 2 according to the present embodiment. In the present sequence, the differences from the operation sequence 1 are mainly described below.

As illustrated in FIG. 9, step S201 to step S204 are performed similarly to step S101 to step S104 of the operation sequence 1.

In step S205, the UE 100 determines whether the white list elapsed time period is within the white list guarantee time period. Hereinafter, a description will be given on the assumption that the white list elapsed time period is determined to exceed the white list guarantee time period.

In step S206, the UE 100 transmits a measurement report including CGI, TAI, CSG ID, Membership status, and white list update information (Whitelist Update Info.) to the eNB 200. The white list update information indicates that that the white list elapsed time period exceeds the white list guarantee time period.

In step S207, the eNB 200 determines to perform handover of the UE 100 to the CSG cell of the HeNB 400 on the basis of the measurement report from the UE 100. Furthermore, the eNB 200 determines whether to omit the CSG verification of the UE 100 by the MME 300 on the basis of the white list update information included in the measurement report. Here, the eNB 200 confirms that the white list elapsed time period exceeds the white list guarantee time period on the basis of the white list update information, and determines to perform the CSG verification.

In step S208, the eNB 200 transmits a CSG verification request of the UE 100, to the MME 300 through the S1 interface. The CSG verification request includes the CSD ID of the CSG cell and the identification of the UE 100.

In step S209, the MME 300 transmits a response indicating a CSG verification result (CSG verification response) to the eNB 200 through the S1 interface. Hereinafter, a description will be given on the assumption that the response indicates verification success (Ack).

In step S210, the eNB 200 transmits a handover request (H.O. Request) for requesting acceptance of the UE 100 to the HeNB 400 through the X2 interface in response to CSG verification success. Step S211 and step S212 that follow are performed similarly to the operation sequence 1.

(4) Conclusion of First Embodiment

As described above, in the mobile communication system including the HeNB 400 configured to form the CSG cell, and the MME 300 configured to perform the CSG verification of the UE 100 for access permission to the CSG cell in the handover procedure of the UE 100 to the CSG cell, the CSG verification of the UE 100 by the MME 300 is omitted in the handover procedure in response to the fact that the white list elapsed time period is within the white list guarantee time period.

Specifically, since the white list is considered to be synchronized with the CSG subscriber information (CSG Subscription Data) managed by the MME 300 immediately after update, when the white list elapsed time period is within the white list guarantee time period, the reliability of the white list is regarded to be high and the CSG verification of the UE 100 by the MME 300 is omitted. In this case, it is possible to apply the handover procedure that bypasses the EPC 20, so that it is possible to efficiently perform the handover procedure to the CSG cell.

In the present embodiment, before the handover procedure, the UE 100 transmits the white list update information to the serving cell (the eNB 200) together with the measurement report regarding the CSG cell. The white list update information indicates whether the white list elapsed time period is within the white list guarantee time period.

In this way, since the UE 100 transmits the white list update information together with the measurement report regarding the CSG cell, when the measurement report is received from the UE 100, the eNB 200 is able to recognize whether the white list elapsed time period is within the white list guarantee time period. Consequently, when starting the handover procedure, it is possible to determine whether to apply the handover procedure that bypasses the EPC 20.

In the present embodiment, the UE 100 updates the white list in response to the white list update message from the MME 300. The white list update message includes information for designating a white list guarantee time period.

In this way, the information for designating the white list guarantee time period is included in the white list update message, so that the EPC 20 side is able to designate the white list guarantee time period, resulting in a change in the white list guarantee time period according to necessity.

In the present embodiment, when it is determined to perform the handover of the UE 100 to the CSG cell and when it is determined that the white list elapsed time period is within the white list guarantee time period on the basis of the white list update information, the eNB 200 omits the CSG verification of the UE 100 by the MME 300 and transmits the handover request to the HeNB 400.

In this way, when it is determined to perform the handover to the CSG cell, if the white list elapsed time period is within the white list guarantee time period, the eNB 200 transmits the handover request to the HeNB 400 through the X2 interface, so that it is possible to quickly perform the handover to the CSG cell.

In the present embodiment, when it is determined to perform the handover of the UE 100 to the CSG cell and when it is determined that the white list elapsed time period exceeds the white list guarantee time period on the basis of the white list update information, the eNB 200 requests the MME 300 to perform the CSG verification of the UE 100.

In this way, when it is determined to perform the handover to the CSG cell, if the white list elapsed time period exceeds the white list guarantee time period, the eNB 200 requests the MME 300 to perform the CSG verification of the UE 100, so that the handover of the UE 100 to the CSG cell is possible.

[Second Embodiment]

Hereinafter, a second embodiment will be described while focusing on the differences from the first embodiment. In the first embodiment, the eNB 200 performed the determination regarding whether to omit the CSG verification of the UE 100 by the MME 300. On the other hand, in the second embodiment, the HeNB 400 performs the determination regarding whether to omit the CSG verification of the UE 100 by the MME 300.

(1) Operation According the Second Embodiment

Hereinafter, operation sequences 1 and 2 of the mobile communication system according to the present embodiment will be described.

The operation sequence 1 is an operation sequence when the UE 100 updates the white list and performs handover to the CSG cell within the white list guarantee time period.

The operation sequence 2 is an operation sequence when the UE 100 updates the white list and performs handover to the CSG cell after the white list guarantee time period elapses.

(1.1) Operation Sequence 1

Figure 10:
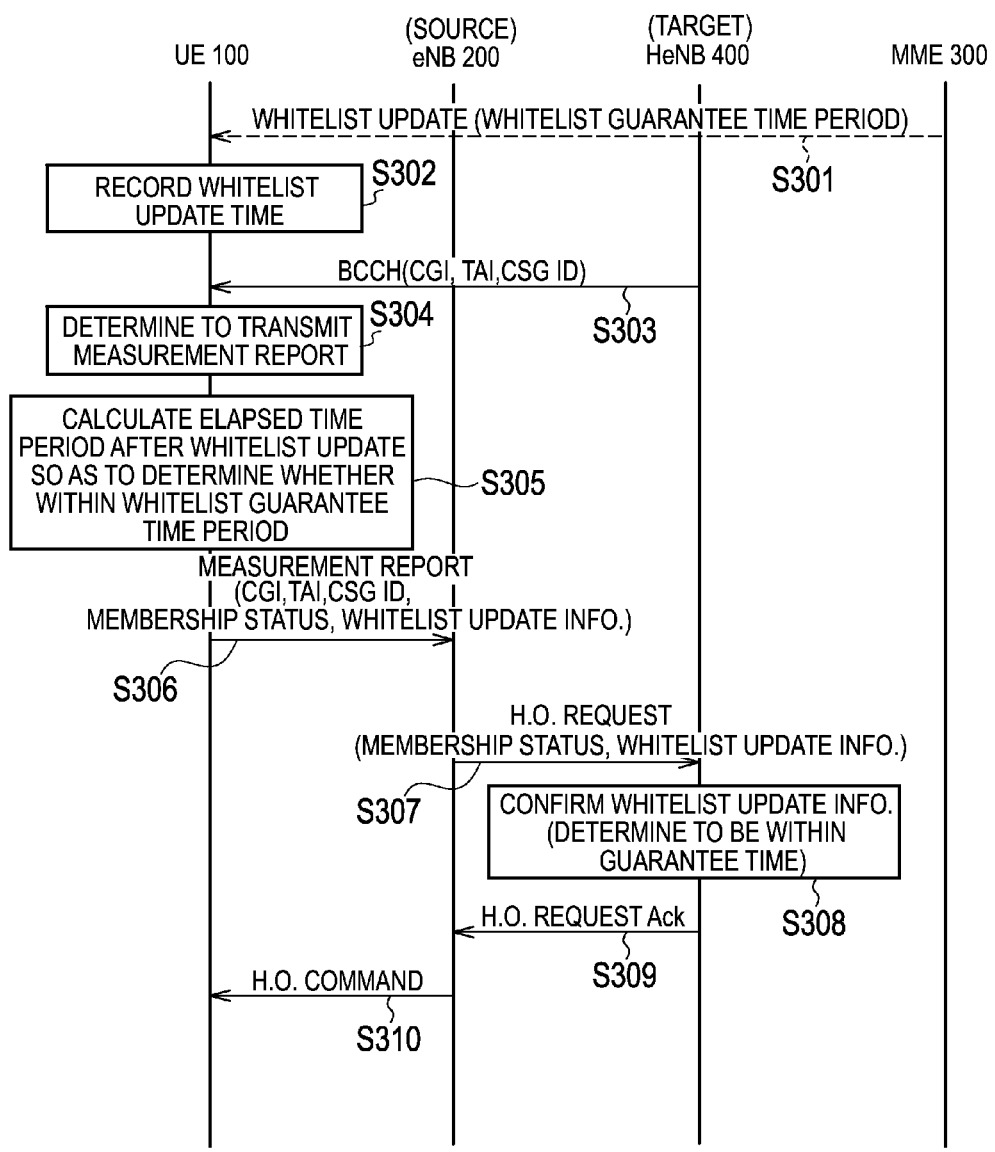
FIG. 10 is a sequence diagram of an operation sequence 1 according to a second embodiment.

FIG. 10 is a sequence diagram of the operation sequence 1 according to the present embodiment. In an initial state of the present sequence, the UE 100 is in a connected state and performs communication by employing the cell of the eNB 200 as a serving cell.

As illustrated in FIG. 10, step S301 to step S305 are performed similarly to the operation sequence 1 according to the first embodiment.

In step S306, the eNB 200 determines to perform handover of the UE 100 to the CSG cell of the HeNB 400 on the basis of the measurement report from the UE 100. From the time point at which it is determined to perform the handover of the UE 100 to the CSG cell, a preparation stage (Preparation) in the handover procedure is started. Differently from the first embodiment, it is noted that the eNB 200 does not perform the determination regarding whether to omit the CSG verification on the basis of the white list update information included in the measurement report.

In step S307, the eNB 200 transmits a handover request (H.O. Request) for requesting acceptance of the UE 100 to the HeNB 400 through the X2 interface. The handover request includes the white list update information (Whitelist Update Info.) included in the measurement report from the UE 100, in addition to Membership status. In the present sequence, the white list update information indicates that the white list elapsed time period is within the white list guarantee time period.

In step S308, when a handover request is received from the eNB 200, the HeNB 400 determines whether to permit the handover request on the basis of the handover request. Specifically, on the basis of the white list update information included in the handover request, the HeNB 400 determines whether to omit the CSG verification of the UE 100 by the MME 300. Here, the eNB 200 confirms that the white list elapsed time period is within the white list guarantee time period on the basis of the white list update information, and determines to omit the CSG verification.

In step S309, the HeNB 400 determines to permit the handover request from the eNB 200 and transmits a positive response (H.O. Request Ack) for the handover request to the eNB 200 through the X2 interface.

In step S310, the eNB 200 transmits a command of the handover (H.O. Command) to the CSG cell to the UE 100 in response to the reception of the positive response (H.O. Request Ack) from the HeNB 400.

(1.2) Operation Sequence 2

Figure 11:
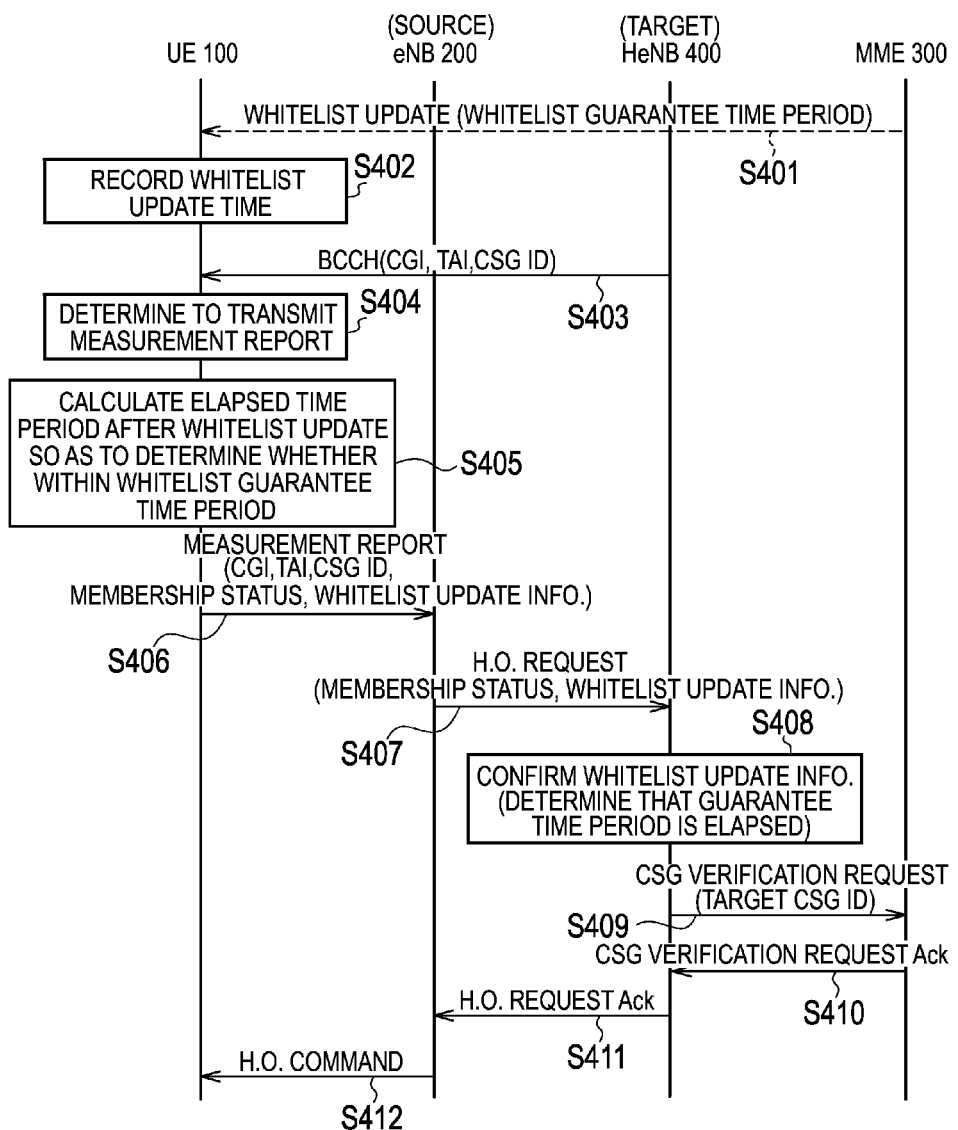
FIG. 11 is a sequence diagram of an operation sequence 2 according to the second embodiment.

FIG. 11 is a sequence diagram of the operation sequence 2 according to the present embodiment.

As illustrated in FIG. 11, step S401 to step S405 are performed similarly to the operation sequence 2 according to the first embodiment.

In step S406, the eNB 200 determines to perform handover of the UE 100 to the CSG cell of the HeNB 400 on the basis of the measurement report from the UE 100. Differently from the first embodiment, it is noted that the eNB 200 does not perform the determination regarding whether to omit the CSG verification on the basis of the white list update information included in the measurement report.

In step S407, the eNB 200 transmits a handover request (H.O. Request) for requesting acceptance of the UE 100 to the HeNB 400 through the X2 interface. The handover request includes the white list update information (Whitelist Update Info.) included in the measurement report from the UE 100, in addition to Membership status. In the present sequence, the white list update information indicates that the white list elapsed time period exceeds the white list guarantee time period.

In step S408, when a handover request is received from the eNB 200, the HeNB 400 determines whether to permit the handover request on the basis of the handover request. Specifically, on the basis of the white list update information included in the handover request, the HeNB 400 determines whether to omit the CSG verification of the UE 100 by the MME 300. Here, the eNB 200 confirms that the white list elapsed time period exceeds the white list guarantee time period on the basis of the white list update information, and determines to perform the CSG verification.

In step S409, the HeNB 400 transmits a CSG verification request of the UE 100 to the MME 300 through the S1 interface. The CSG verification request includes the CSD ID of the CSG cell and the identification of the UE 100.

In step S410, the MME 300 transmits a response indicating a CSG verification result (CSG verification response) to the HeNB 400 through the S1 interface. Hereinafter, a description will be given on the assumption that the response indicates verification success (Ack).

In step S411, the HeNB 400 determines to permit the handover request from the eNB 200 and transmits a positive response (H.O. Request Ack) for the handover request to the eNB 200 through the X2 interface.

In step S412, the eNB 200 transmits a command of the handover (H.O. Command) to the CSG cell to the UE 100 in response to the reception of the positive response (H.O. Request Ack) from the HeNB 400.

(2) Conclusion of Second Embodiment

As described above, in the present embodiment, when it is determined to perform the handover of the UE 100 to the CSG cell, the eNB 200 transmits the white list update information to the HeNB 400 together with the handover request.

In this way, the white list update information is transmitted to the HeNB 400 together with the handover request, so that the HeNB 400 is able to determine whether to permit the handover request on the basis of the white list update information.

In the present embodiment, when it is determined that the white list elapsed time period is within the white list guarantee time period on the basis of the white list update information, the HeNB 400 omits the CSG verification of the UE 100 by the MME 300 and transmits a response for the handover request to the eNB 200.

In this way, the HeNB 400 confirms the validity of the UE 100 (that is, the validity of the white list), thereby permitting the handover request from the eNB 200.

In the present embodiment, when it is determined that the white list elapsed time period exceeds the white list guarantee time period on the basis of the white list update information, the HeNB 400 requests the MME 300 to perform the CSG verification of the UE 100.

In this way, when it is not possible to confirm the validity of the UE 100 (that is, the validity of the white list), the HeNB 400 requests the MME 300 to perform the CSG verification of the UE 100, so that the handover of the UE 100 to the CSG cell is possible.

[Other Embodiments]

While the present invention has been described by way of the foregoing embodiments, as described above, it should not be understood that the statements and drawings forming a part of this disclosure limit the invention.

For example, in the aforementioned embodiments, the handover procedure to the CSG cell has been mainly described. However, the present invention may also be applied to a handover procedure to a hybrid cell.

Furthermore, the aforementioned each embodiment has described an example in which the white list update information (Whitelist Update Info.) is information indicating whether the white list elapsed time period is within the white list guarantee time period.

However, the white list update information may be information indicating a white list update time. In this case, the base station (the eNB 200 or the HeNB 400) side calculates the white list elapsed time period.

Furthermore, it is sufficient if the white list update information is information based on the white list elapsed time period or the white list update time, and the white list update information may be information simply indicating "whether CSG verification by the MME 300 is necessary (that is, whether to guarantee that the UE 100 is a CSG member)".

It is noted that the entire content of U.S. Provisional Application No. 61/612,035 (filed on Mar. 16, 2012) is incorporated in the present specification by reference.

[Industrial Applicability]

According to the present invention, the communication control method, the user terminal, the base station, and the home base station are beneficial in the mobile communication field because it is possible to efficiently perform a handover procedure to a specific cell by the communication control method, the user terminal, the base station, and the home base station.

The invention claimed is:

1. A communication control method applied to a mobile communication system, the mobile communication system including:
   a home base station that forms a specific cell; and
   a mobility management device that performs verification of a user terminal for access permission to the specific cell in a handover procedure of the user terminal to the specific cell, the communication control method comprising:
   a step A of updating, by the user terminal, a list of a specific cell accessible by the user terminal;
   a step B of omitting the verification of the user terminal by the mobility management device in the handover procedure when an elapsed time period after the update of the list is within a predetermined time period; and
   a step C of transmitting, by the user terminal, a measurement report regarding the specific cell to a serving cell before the handover procedure,
   wherein in the step C, the user terminal transmits predetermined information on the elapsed time period or an update time of the list together with the measurement report.

2. The communication control method according to claim 1, wherein the predetermined information indicates whether the elapsed time period is within the predetermined time period.

3. The communication control method according to claim 2, wherein
   in the step A, the user terminal updates the list in response to a list update message from the mobility management device, and
   the list update message includes information for designating the predetermined time period.

4. The communication control method according to claim 1, further comprising:
   a step D of omitting, by a base station forming the serving cell, the verification of the user terminal by the mobility management device and transmitting a handover request to the home base station when it is determined to perform handover of the user terminal to the specific cell and determined that the elapsed time period is within the predetermined time period on the basis of the predetermined information.

5. The communication control method according to claim 4, further comprising:
   a step E of requesting, by the base station, the mobility management device to perform the verification of the user terminal when it is determined to perform the handover of the user terminal to the specific cell and determined that the elapsed time period exceeds the predetermined time period on the basis of the predetermined information.

6. The communication control method according to claim 1, further comprising:
   a step F of transmitting, by a base station forming the serving cell, the predetermined information to the home base station together with a handover request when it is determined to perform handover of the user terminal to the specific cell.

7. The communication control method according to claim 6, further comprising:

a step G of omitting, by the home base station, the verification of the user terminal by the mobility management device and transmitting a response for the handover request to the base station when it is determined that the elapsed time period is within the predetermined time period on the basis of the predetermined information.

8. The communication control method according to claim 7, further comprising:

a step H of requesting, by the home base station, the mobility management device to perform the verification of the user terminal when it is determined that the elapsed time period exceeds the predetermined time period on the basis of the predetermined information.

9. A user terminal, which performs handover to a specific cell from a serving cell in a mobile communication system including a mobility management device that performs verification for access permission to the specific cell in a handover procedure to the specific cell, comprising:

a control unit that controls to update a list of a specific cell accessible by the user terminal; and a transmission unit that transmits a measurement report regarding the specific cell to the serving cell, wherein the transmission unit transmits predetermined information on an elapsed time period after the update of the list or an update time of the list together with the measurement report.

10. A base station, which forms a serving cell of a user terminal in a mobile communication system including a mobility management device that performs verification for access permission to a specific cell in a handover procedure to the specific cell and the user terminal that updates a list of cells accessible by the user terminal, the base station comprising:

a reception unit that receives, from the user terminal and before the handover procedure, (i) predetermined information on an elapsed time period or an update time of the list together with (ii) a measurement report regarding the specific cell; and a control unit that controls to omit verification, by the mobility management device, of the user terminal in the handover procedure when the elapsed time period after the update of the list is within a predetermined time period.

11. A home base station, which forms a specific cell in a mobile communication system including a mobility management device that performs verification for access permission to the specific cell in a handover procedure to the specific cell and a user terminal that updates a list of cells accessible by the user terminal, the home base station comprising:

a reception unit that receives predetermined information on an elapsed time period or an update time of the list, from a base station forming a serving cell of the user terminal; and a control unit that controls to omit verification, by the mobility management device, of the user terminal in the handover procedure when the elapsed time period after the update of the list is within a predetermined time period;

wherein the predetermined information is transmitted, from the user terminal to the serving cell, together with a measurement report regarding the specific cell, before the handover procedure.

* * * * *